United States Patent [19]

Hedstrom

[11] 4,108,091
[45] Aug. 22, 1978

[54] ELECTRONIC CIRCUITS FOR SEWING MACHINES
[75] Inventor: Per-Goran Hedstrom, Huskvarna, Sweden
[73] Assignee: Husqvarna AB, Huskvarna, Sweden
[21] Appl. No.: 669,629
[22] Filed: Mar. 23, 1976
[30] Foreign Application Priority Data
Jun. 18, 1975 [SE] Sweden .............................. 7506986
[51] Int. Cl.² .............................................. D05B 3/02
[52] U.S. Cl. ................................................ 112/158 E
[58] Field of Search .......... 112/158 E, 158 R, 121.11, 112/121.12; 340/172.5; 307/221 R

[56] References Cited
U.S. PATENT DOCUMENTS

| 3,752,098 | 8/1973 | Logan | 112/121.12 |
| 3,820,082 | 6/1974 | Bauknecht | 340/172.5 |
| 3,855,956 | 12/1974 | Wurst | 112/158 E |
| 3,872,808 | 3/1975 | Wurst | 112/158 E |

Primary Examiner—Werner H. Schroeder
Assistant Examiner—Peter Nerbun
Attorney, Agent, or Firm—Holman & Stern

[57] ABSTRACT

A control unit for a sewing machine includes a mechanism for mechanically positioning the stitch-forming members and a pattern memory unit for controlling this mechanism, from which stitch position detemining code words belonging to a specific pattern can be selected by the operator. The code word for determining a stitch position is read from the pattern memory into a shift register. The shift register is shifted in relation to the movement of the main shaft of the sewing machine so that code words for each successive stitch of a pattern are successively made available to the mechanical positioning mechanism. The succession of code words in a pattern can be recirculated in the shift register at the end of a pattern cycle, for repetition of the pattern.

15 Claims, 3 Drawing Figures

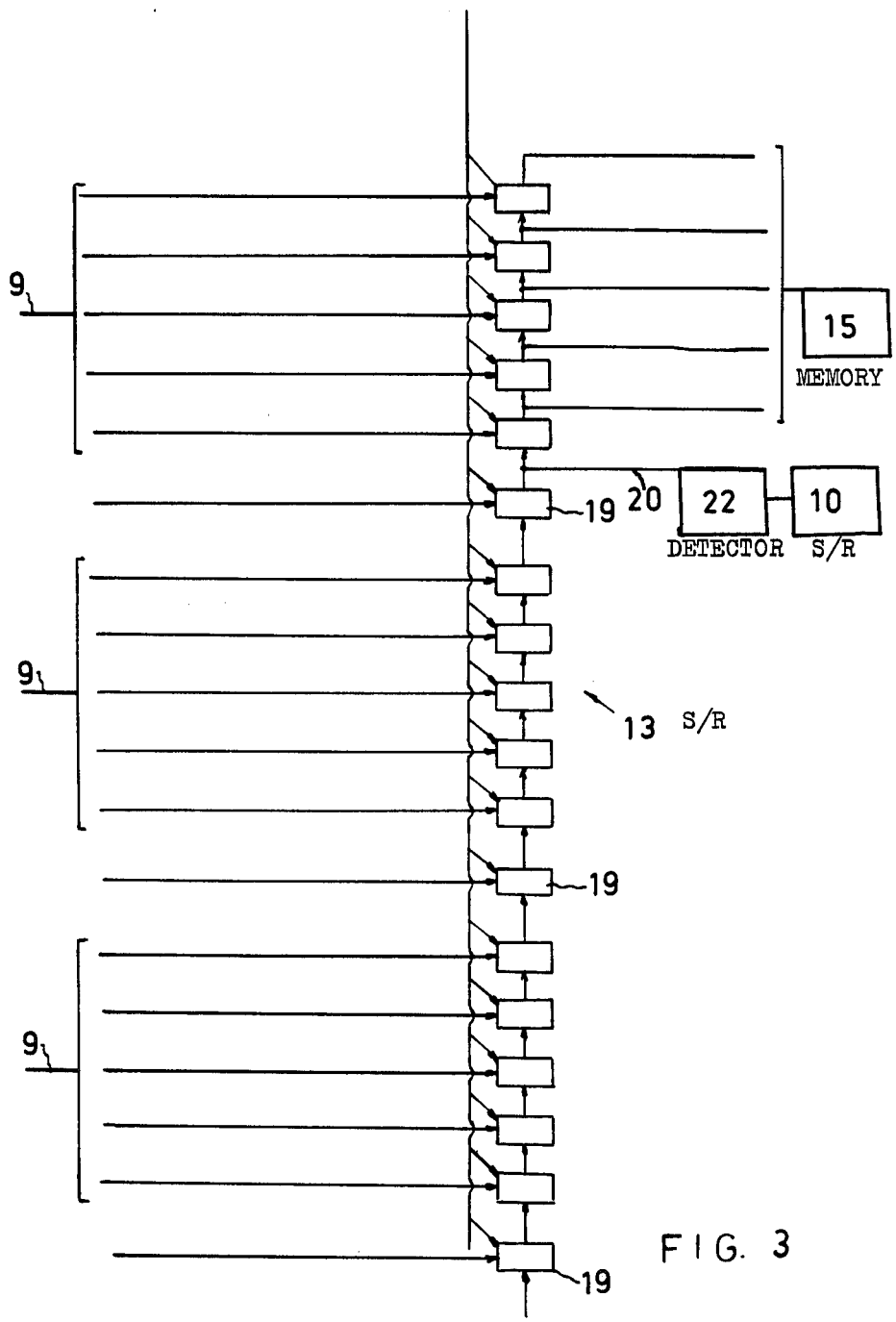

ELECTRONIC CIRCUITS FOR SEWING MACHINES

FIELD OF THE INVENTION

The invention disclosed relates to electronic control circuits for a home sewing machine, equipped with devices for pattern sewing, which circuits emit electrical signals to receiving devices for the adjustment of the machine's needle-bar and/or feed mechanisms in order to produce multistitch patterns.

BACKGROUND OF THE INVENTION

Ever since the electronic computer became a technological reality, it has been evident that it would also be technically possible to store and process pattern information in a pattern sewing machine according to the same principles as in an electronic computer, using a pattern memory.

But in a sewing machine there is the problem that the signals emitted by such an electronic control circuit must be transformed into mechanical movement so that the resetting of the feed or needle-bar movements will take place. Such transformation can, in principle, be made in many different ways, but practical working devices have only recently been constructed.

There remains an unfulfilled need to establish a practical and efficient means for accessing control words from the pattern memory. A generalized system for accessing the pattern memory is shown in FIG. 1, for the purpose of illustrating the functions which must be performed. From an entirely general standpoint, it contains, first of all, the pattern memory 1 whose outputs control the mechanical pattern mechanism 2. The inputs of a standard memory circuit are, in order to obtain the lowest possible number of connections, always binary-coded, that is to say if the memory has space for 1024 code words, for example, than the memory will have 10 address leads. In order to select in the correct sequence, the codes stored in the pattern memory 1 which belong to a certain pattern, a device is required which can change the address word signals on the abovementioned address leads, during each machine revolution, so that correct control information is always present at the outputs of the pattern memory 1 for each stitch. This might be done, for example, with a counter circuit 3, whose outputs will constitute the pattern memory addressing, the computer being stepped in relation to the stitch being made. In order that this counter or addressing device 3 will begin generating the group of addresses relating to the code word of the selected pattern, the counter 3 must be pre-adjusted with a starting address selected for the actual pattern. These starting addresses must therefore be stored in a special address memory 4, in which a specific starting address code word is activated by the selection of the desired pattern seam. Finally, there must be a reset circuit 5, for the end of the pattern cycle, so that the addressing device 3 in some way will be made to repeat, and any desired number of consecutive pattern images can be sewn. It is not obvious to find the technical solution of this problem, but this invention presents one solution and constitutes an improvement of priorly known control devices of the aforementioned kind. Control circuits designed in accordance with the theory here described and built of standard components are assembled of a plurality of such components in which the necessary functions are carried out one by one. However, if the functions are assembled on one single semiconductor crystal arize alternative solutions, and the inventive idea as described in the following is developed on this background.

OBJECTS OF THE INVENTION

It is therefore an object of the invention to digitally control a sewing machine in an improved manner.

It is another object of the invention to control the execution of a stitching pattern stored in a sewing machine in an improved manner.

It is yet another object of the invention to access the pattern memory of a pattern controlled sewing machine in an improved manner.

It is still another object of the invention to control the repetition of a stitching pattern stored in a sewing machine.

SUMMARY OF THE INVENTION

These and other objects, features and advantages of the invention are accomplished by the electronic control circuits for sewing machine disclosed herein.

A control unit for a sewing machine includes a mechanism for mechanically positioning the stitch-forming members and a pattern memory unit for controlling this mechanism, from which stitch position determining code words belonging to a specific pattern can be selected by the operator. The code word for determining a stitch position is read from the pattern memory into a shift register. The shift register is shifted in relation to the movement of the main shaft of the sewing machine so that code words for each successive stitch of a pattern are successively made available to the mechanical positioning mechanism. The succession of code words in a pattern can be recirculated in the shift register at the end of a pattern cycle, for repetition of the pattern.

DESCRIPTION OF THE FIGURES

These and other objects, features and advantages of the invention will be more fully appreciated with reference to the accompanying drawings.

FIG. 3 is a detailed diagram of the connections to shift register 13 and an enlargement of the square outlined in FIG. 2.

DISCUSSION OF THE PREFERRED EMBODIMENT

It should first be made clear that even if the structure of an integrated semiconductor read-only memory (ROM), seen from the outside, may happen to be three-dimensional, in that the digital code words entering into the memory are addressed in a plane ($x$, $y$ plane), and the words also contain a plurality of bits, that is to say, in an imaginary z-direction, the total structure for technical reasons is nevertheless basically entirely planar.

Figure 2:
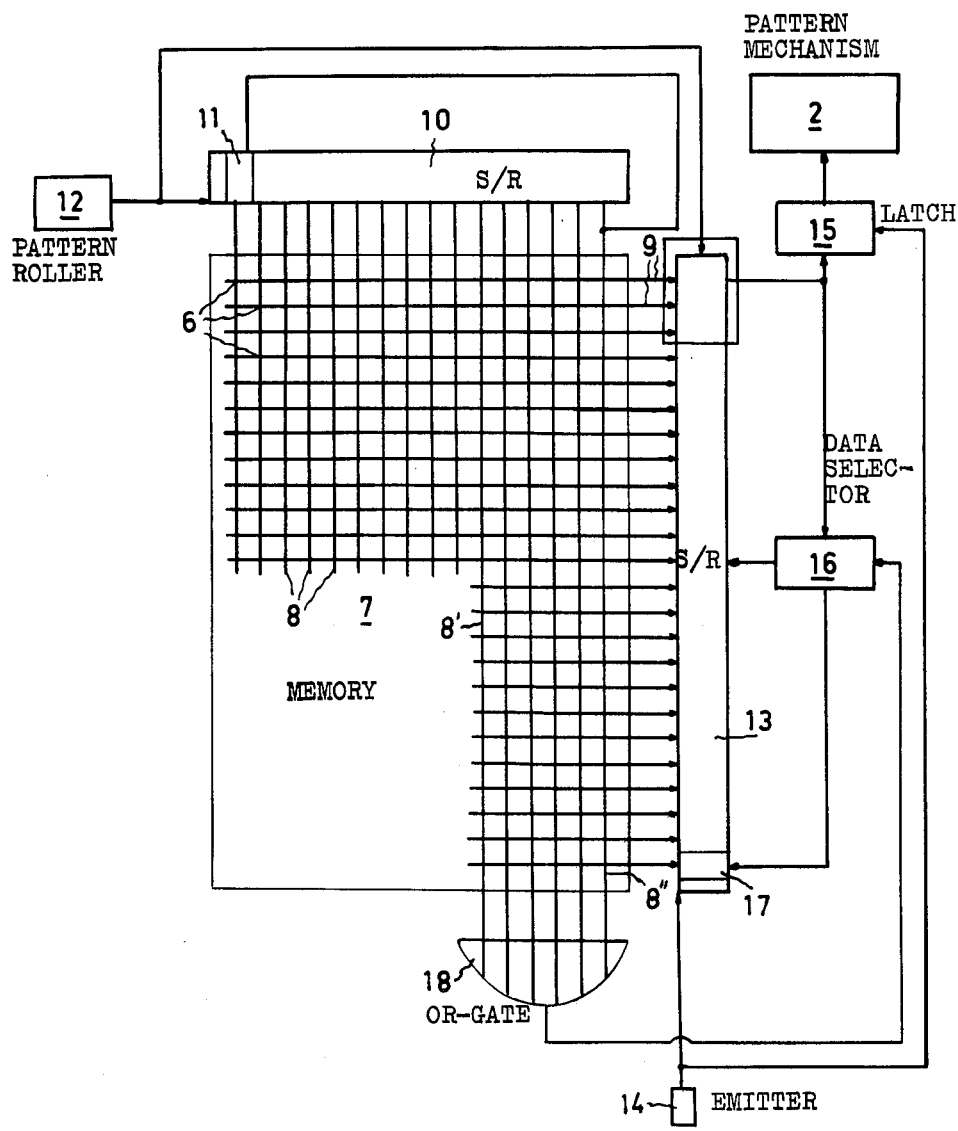
FIG. 2 is a circuit diagram of the control circuits according to the invention.

In FIG. 2, however, for the sake of clarity, each point of intersection 6 in a read-only memory 7 will represent a digital word with, for example, 5 bits, which are led out on the connections that are clarified in the detail in FIG. 3.

The information in the read-only memory is so arranged that each and every of the vertical address lines 8 corresponds to one of the sewing machine's patterns. Thus at the points of intersection along such a line, we find the code words corresponding to respective stitches in this pattern. For example, line 8' thus contains 24 code words. The read-out memory, in the embodiment shown, exhibits 24 outputs 9, each one with the connections as seen in FIG. 3.

A shift register 10 has outputs connected with the vertical address lines. When the shift register 10, on switching to a main supply, is preset to a specific state, for example, a logical one in first shift register cell 11, and logical zeroes otherwise, the desired line of the vertical address lines can be activated since the logical one can be shifted forward in the shift register 10 under the influence of a pattern selection tangent 12. If the logical one is shifted up to the last cell in the shift register 10, that is to say, picking out line 8" in FIG. 2 and the pattern roller tangent 12 is again activated, then the logical one is shifted once more into the first cell 11 of the shift register 10.

When a specific vertical address line is activated in this way, for example, line 8', there will exist, at the outputs 9 of the read-only memory 7, all of the code words belonging to the pattern, which form the complete cycle for this pattern. This information is read into another shift register 13 at the same moment as the logical one in shift register 10 was shifted forward to the address line 8 in question. This method of reading information into a shift register is known as parallel loading and more specifically involves simultaneous application of pulses to the inputs of the shift register.

Figure 1:
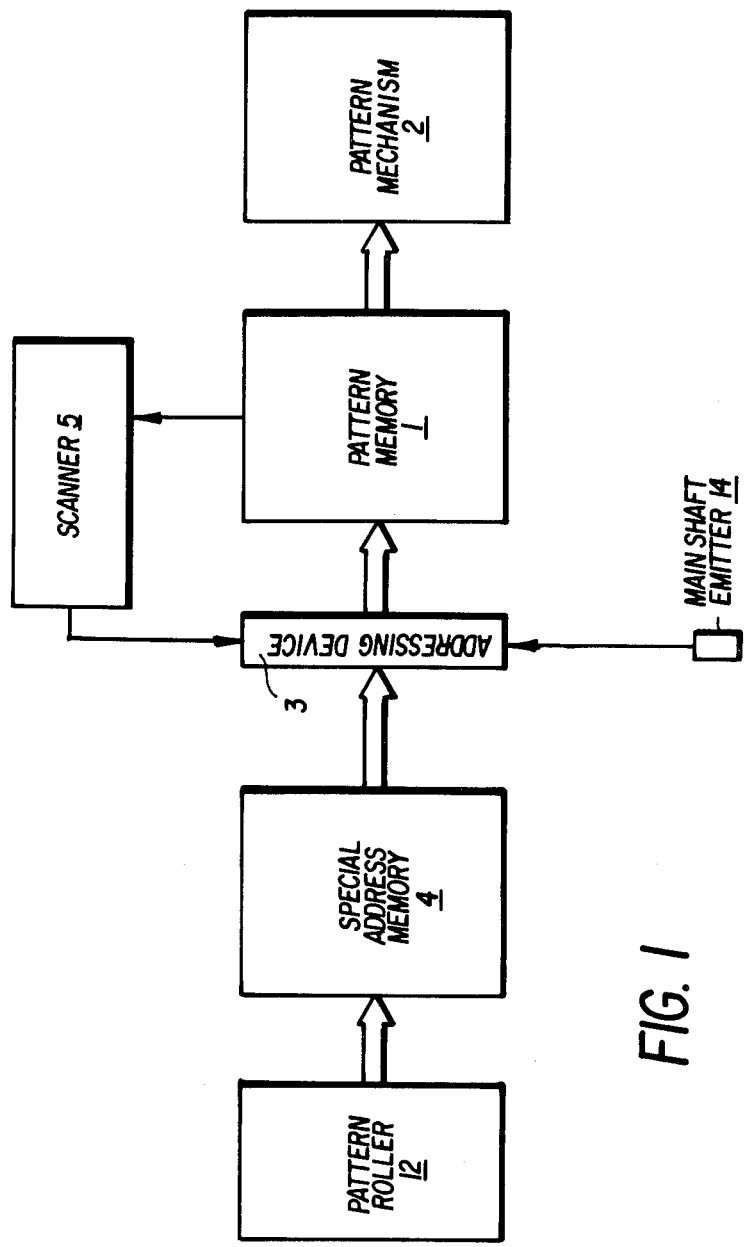
FIG. 1 is a block diagram of a general principle, described above, for constructing control circuits for the present purpose in question.

In shift register 13 one now finds all information stored for the movements of the needle-bar and/or the feed movements in a complete pattern cycle. This information is shifted forward through the shift register 13 with a code word for each revolution of the main shaft of the machine. The shift pulse is received from a pulse emitter 14 coupled to the main shaft. The emitter 14 also emits writing pulses to an intermediate memory 15, which is of the read-write type. Thus for each stitch, the respective mechanical pattern mechanisms 2 of FIG. 1 receive new information from the output of the intermediate memory 15.

The outgoing information code word, which is written in intermediate memory 15 from shift register 13 is also fed back via a turnover or selector switch 16 to the input cell 17 of shift register 13. In this way, the information of the pattern cycle will circulate so that the pattern can be repeated as many times as desired.

However, not all of the desired patterns in a sewing machine have an equal number of stitches in the pattern cycle. Therefore the read-only memory 7 is organized in a number of groups of patterns with equal numbers of stitches. In FIG. 2, we can see two groups, namely pattern marked 8 with 12 stitches in the cycle, and pattern marked 8'-8" with 24 stitches in the cycle. An OR gate 18 determines whether any one of the lines 8'-8" is activated. If this is not the case, gate 18 controls switch 16 in such a way that the information from the output of shift register 13 is fed back to the cell in shift register 13 which corresponds to the number of stitches in pattern group 8.

The number of cells in shift register 13 taking part in the recirculation of pattern information may thus always be modified so that it corresponds to the number of stitches in a pattern cycle of an actual pattern group. There can be any number of pattern groups, and there can suitably be more than the two shown.

An alternative method for producing recirculation according to the invention is carried out as follows. When the pattern information is read in from read-only memory 7 into shift register 13, this is done in groups of, for example, 5 binary bits in each group. These groups are placed in the shift register 13 with a shift register cell 19 between each group. Into these cells 19 lying between the groups, an end-of-pattern bit is read in, for example in such a way that in the cell lying adjacent to the last group of pattern information, a logical "one" is read in while in the other cells of this type logic "zeroes" are read in. The source of this end-of-pattern bit may be an extra bit location stored with each code word in the memory 7. Then, after the register contents are shifted forward, each sixth bit is tested at line 20 by a detector 22. When a logical one is observed by the detector 22, this implies that the last information group has been passed. The output of detector 22 is connected to shift register 10 so that when the end-of-pattern bit is a logical one, all of the pattern information is again read into shift register 13 from the read-only memory 7. In this alternative form, the grouping of the read-only memory 7 in patterns with equal numbers of stitches is unnecessary, hence every pattern now in place can contain any desired number of stitches. Other embodiments within the spirit and scope of this invention will become apparent to those skilled in the art.

What I claim is:

1. A control unit for a pattern sewing machine including a movable main shaft mechanism for mechanically positioning stitch-forming members and a memory unit for controlling such mechanism, from which stitch position determining code words belonging to a specific pattern, can be selected by an operator, comprising:

a shift register (13) having cells connected to output lines from said memory; means for parallel loading of said code words into said shift register cells; and means for shifting said code words in relation to the movement of the main shaft of the sewing machine so that for each stitch in said pattern, code words belonging thereto are output to said positioning mechanism from said shift register.

2. Control unit according to claim 1, wherein code words issuing from said shift register (13) are fed back to said shift register so that all code words constituting the pattern can recirculate in correct sequence any desired number of times.

3. Control unit according to claim 2, wherein the portion of said shift register's cells which participate in the recirculation, can be varied to a number corresponding to the number of stitches in the pattern cycle of the selected pattern.

4. Control unit according to claim 1, which further comprises:

a second register for selecting the desired pattern by the operator by shifting a logic signal which will actuate the memory cells in the memory unit where the pattern's code word is present.

5. Control unit according to claim 1, wherein the pattern information is again read into said shift register after each completed pattern cycle.

6. Control unit according to claim 1, which further comprises:

a decoder connected to said shift register for decoding the shift register's contents for identification of the end of the pattern information.

7. Control unit according to claim 6, wherein in addition to the code word information in the shift register pertaining to the stitch pattern, an information bit is present at equal bit increments in the shift register, indicating the end of the pattern information.

8. A control circuit for a pattern controlled sewing machine according to claim 1 having a main shaft and a mechanism for mechanically positioning stitch-forming members in response to control signals, comprising:

a pattern selecting means (12);

a pattern memory unit (7) for storing stitch position determining code words belonging to a specific pattern selectable by said pattern selecting means, the memory being organized into rows and columns of said code words with each column storing code words representing a specific one of said patterns, connected to a respective address input line from said pattern selecting means, and said rows connected to respective data output lines, a given code word being output on the data output line in its respective row when the address input line in its respective column is activated by said pattern selecting means;

an emitter means (14) connected to said main shaft, for emitting pulses synchronously with the rotation of said shaft;

a shift register means (13) having a plurality of storage cells, each of which has an input connected to a respective one of said data output lines of said memory unit, a shift control input connected to said emitter means for shifting said code words along successive storage cells toward a first storage cell in response to pulses from said emitter, and a data output line from said first one of said storage cells, connected as a control input to said positioning mechanism (2) for outputting successive code words in response to pulses from said emitter to mechanically position said stitch-forming members.

9. The control circuit of claim 8, which further comprises:

a feedback means (16, 17) having an input connected to said data output line of said first storage cell of said shift register and an output connected to the input of a last storage cell of said shift register, for recirculating control words output from said shift register;

whereby said pattern may be repeated.

10. The control circuit of claim 9, wherein said first and last storage cells of said shift register load the first and last control words for the pattern to be executed, from said pattern memory.

11. The control circuit of claim 9, which further comprises:

said pattern memory storing a first plurality of patterns composed of $m$ (8′) code words, and a second plurality of patterns composed of $n$ (8) code words;

an OR circuit (18) having $m$ input lines connected to the ones of said input address lines to said pattern memory corresponding to said first plurality of patterns;

said feedback means including a switching means having a data input connected to said first storage cell, a first data output connected to the mth cell from said first shift register cell, a second data output connected to the nth cell from said first shift register cell, and a control input connected to the output of said OR circuit, for selectively switching the control words through said feedback means to said mth cell or said nth cell in response to the output of said OR circuit indicating said pattern as being $m$ or $n$ control words in length.

12. The control circuit of claim 8, which further comprises:

said control words being composed of $n$ bits;

said pattern memory storing along with each said control word, an end of pattern bit as an $n + 1$st bit;

detection means having an input connected to the nth cell from said first shift register cell and an output connected to said pattern memory, for detecting the presence of said end of pattern bit and causing said pattern memory to repeat the output of all the code words for the pattern being executed, to said shift register;

whereby said pattern may be repeated.

13. The control circuit of claim 8, wherein said pattern selecting means includes:

a column addressing means (10) having an input connected to a selector (12) and output lines connected to respective ones of said columns, for addressing a selected one of said columns of control words stored in said pattern memory and causing said control words so addressed, to be output on said output lines to be stored in said storage cells of said shift register.

14. The control circuit of claim 13, wherein said column addressing means includes a second shift register having a control input connected to said selector and a plurality of storage cells, each with an output connected to one of said input address lines, for storing a one bit in one cell and zero bits in the other cells thereof to selectively activate one of said input address lines of said pattern memory.

15. The control circuit of claim 14, wherein said selector is the pattern roller tangent of said sewing machine.

* * * * *